INVENTOR
ADAM J. LLOYD
BY
Kimmel, Crocwell & Weaver
ATTORNEYS

June 20, 1972  A. J. LLOYD  3,671,211

PLUNGER FOR BOTTLE MAKING MACHINE

Filed July 6, 1970  3 Sheets-Sheet 2

INVENTOR
ADAM J. LLOYD

BY *Kimmel, Crowell & Weaver*
ATTORNEYS

June 20, 1972  A. J. LLOYD  3,671,211
PLUNGER FOR BOTTLE MAKING MACHINE
Filed July 6, 1970  3 Sheets-Sheet 3

INVENTOR
ADAM J. LLOYD
BY
Kimmel, Crowell & Weaver
ATTORNE

United States Patent Office

3,671,211
Patented June 20, 1972

3,671,211
PLUNGER FOR BOTTLE MAKING MACHINE
Adam J. Lloyd, deceased, late of Millville, N.J., by Leona A. Lloyd, executrix, 338A Court Blvd., Millville, N.J. 08332
Filed July 6, 1970, Ser. No. 52,485
Int. Cl. C03b 9/36
U.S. Cl. 65—234
5 Claims

ABSTRACT OF THE DISCLOSURE

A vented plunger tip is provided for use with the Hartford I.S. Machine and similar blow and blow bottle equipment to vent air trapped by the glass gob as the glass gob is being forced into the mold and into engagement with the plunger tip to eliminate temperature variations and to thereby reduce settle wave problems. Central vent holes communicate from the tip of the plunger to an axial bore and exhaust ports extend from the axial bore through the side walls of the plunger to permit trapped air from the area near the tip of the plunger to escape. Pad vents in the neck ring mold and the blank mold are also disclosed for further assisting in the elimination of temperature differentials.

BACKGROUND OF THE INVENTION

Field of the invention

The present invention is an improvement on glass bottle parison machines of the type represented by the Hartford I.S. Machine or any type of parison bottle forming machine that involves the use of a plunger for forming the inside cavity or of the finish.

Description of the prior art

In prior art parison bottle forming machines, the loading of the glass gob into the blank mold traps atmospheric air, forcing it to the bottom of the blank mold, inside the neck ring and around the plunger, and this trapped air resists the efforts of the settle blow air, a force of compressed air used to force the glass gob down compactly into the finish ring. Under these conditions, excess settle blow air force and time are required. Further, the presence of the air in the neck ring area and adjacent to the plunger cause undesirable temperature variations which affects the flow characteristics of the glass when counterblow air is admitted and causes settle wave problems so that a certain percentage of bottles made will not be usable. Attempts have been made to solve this settle wave problem as in Colchagoff Patent 3,357,809 where slots were provided in the plunger tip so that trapped atmospheric air could be accommodated in the slots. This plunger tip has not, however, been widely used, and it is believed that this is so because it fails to eliminate temperature differentials, which I believe to be one of the principal causes of settle wave problems. Hamilton Patent 3,272,612 represents another approach in which a vacuum is drawn in the neck ring and plunger area prior to the admission of counterblow air so that the glass gob will be in more intimate contact with the neck ring and plunger. This device has not been widely adopted, however, because the use of the vacuum has tended to chill the neck ring and plunger areas whereby temperature differentials are set up so that the flow characteristics of the glass are adversely affected on counterblow.

SUMMARY OF THE INVENTION

The present invention involves the formation of a plunger having vent holes opening through the tip thereof into a central bore with radially extending exhaust ports opening outwardly through the side walls of the plunger and communicating with the counterblow bores. The plunger is otherwise identical to the plunger which it is replacing so that it can be used in the same machine manufacturing any type bottle it has previously manufactured without tip shape changes and without additional modifications of the plunger which it replaces. This means that the plungers incorporating the invention do not vary in design from past design requirements as demanded by the bottle's particular shape, size, capacity, etc.

DESCRIPTION OF THE PREFERRED EMBODIMENTS

Figure 1:
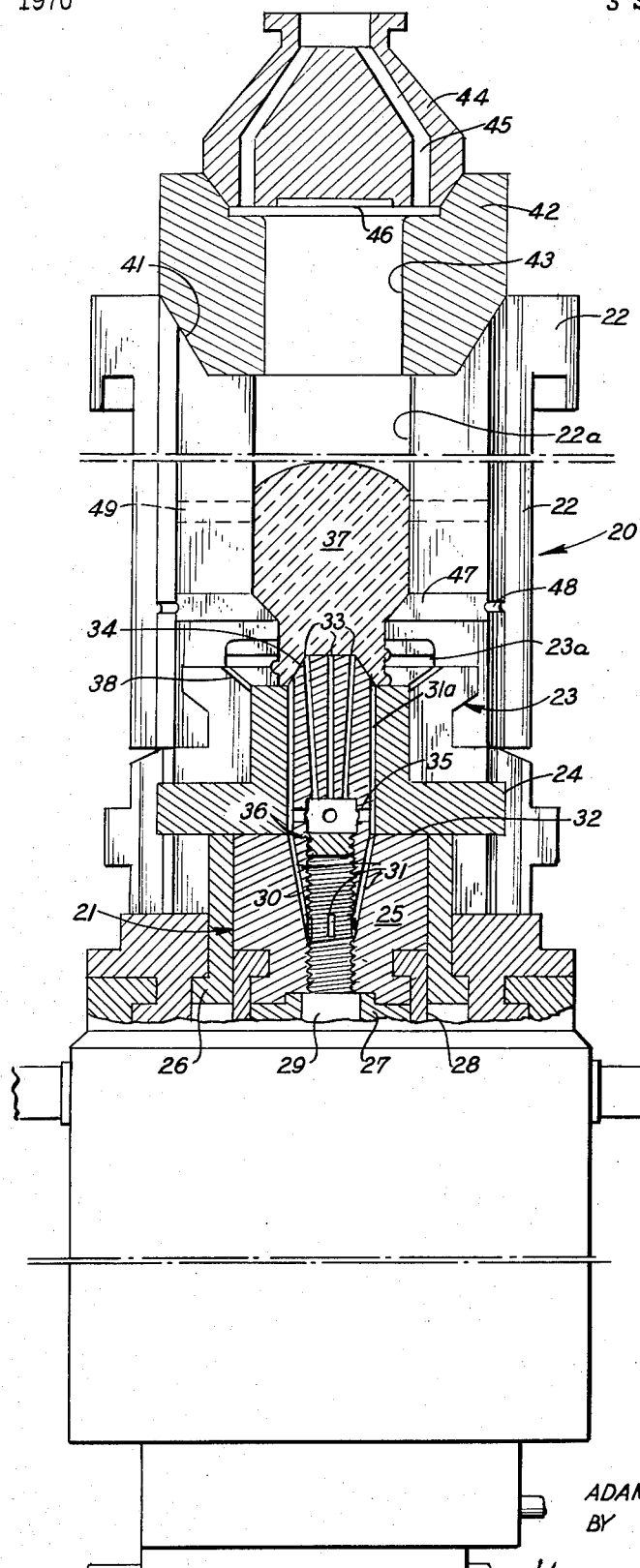
FIG. 1 is a partial vertical sectional view, partially broken away, of the invention shown in position in a parison glass bottle molding machine.

Referring now to the drawings in detail wherein the reference characters indicate like parts throughout the several figures, reference numeral 20 indicates generally a glass bottle parison machine incorporating a plunger assembly generally indicated at 21 constructed in accordance with the present invention.

The glass bottle parison machine 20 includes a blank mold 22 comprised of half sections of conventional design and forming a parison cavity 22a. A neck ring mold 23, comprised of half sections of conventional design, is provided for forming the relatively narrow neck of the bottle and a pad vent 23a is formed in the male half thereof. This vent is approximately .002 inch in depth and permits air trapped in the neck ring mold to be vented to atmosphere. More than one of such pad vents may be used if desired. A finish ring 24 is positioned within the neck ring 23 and has a plunger 25 mounted for reciprocation therethrough. The plunger 25 slides in a collar 26 and is supported thereby. A piston rod 27 is secured to the plunger 25 by a clamp ring 28 and has a conduit 29 extending centrally therethrough whereby counterblow air may be admitted to the plunger assembly 21.

A central bore 30 extends into the plunger 25 and a plurality of flared ports 31 are provided, which ports extend upwardly and outwardly from the central bore at an angle thereto. The ports 31 open through a shoulder 32 in the plunger 25. The plunger 25 has a tip 34 which is the part of the plunger that is slidable in the finish ring 24. The ports 31 are in vertical registry with grooves 31a that extend axially along the periphery of the tip 34. A plurality of vent ports 33 open downwardly through the tip 34 of the plunger 25. These ports extend inwardly at a slight angle from their upper ends toward their lower ends, and are of a size that will permit the passage of air therethrough, but will not permit the passage of glass. A plurality of radially extending exhaust parts 35, located at the top of the bore 30 and at the bottom of the plunger tip 34, are in communication with the bottoms of the vent ports 33 and open through the side of the tip 34 so as to communicate with the grooves 31a.

The plunger 25 is in its extended position as illustrated in FIG. 1 and the vent holes 33 form a passage to the top of the bore 30 and from there to the exhaust ports 35 and then down through the grooves 31a and the ports 31 to the lower portion of the bore 30 so that the vented air can bleed out through the lower portion of the bore 30. A plug 36 closes the bore 30 between the areas of intersection of the ports 31 and 35 with the bore 30 to prevent direct communication between the vent holes 33 and the lower portion of the bore 30.

Figure 14:
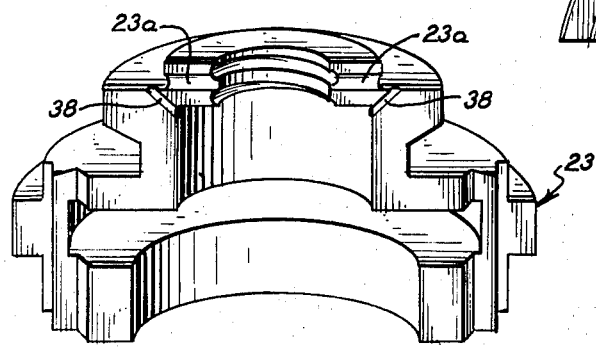
FIG. 14 is a perspective view of the male half of the neck ring mold.
Figure 16:
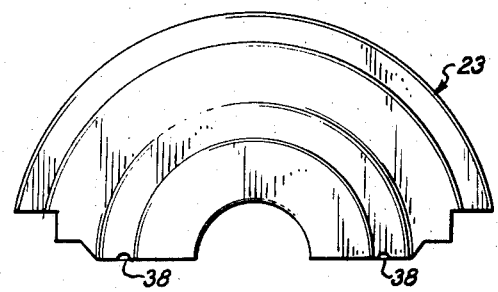
FIG. 16 is a top plan view of the male half of the neck ring mold shown in FIG. 14.

As described below, in the operation of the machine, the plunger 25, including the plunger tip 34, is retracted or lowered from the FIG. 1 position and counterblow air is admitted through the conduit 29. It is desirable in the conventional operation of the Hartford I.S. machine that there be no air flowing upwardly through the conduit 29 except at the portion of the machine cycle described below. However, it is a characteristic of the Hartford I.S. machines that, due to leakage, air escapes into the conduit 29 even when the counterblow that deliberately causes air to be forced through the conduit 29 is shut off, this escape of air being known as counterblow leakage. The plug 36 and the radial exhaust ports 35 inhibit this counterblow leakage from entering the vent ports 33, the counterblow leakage traveling up the grooves 31a from whence it may escape to atmosphere through file vents 38 (FIGS. 1 and 14) formed in the neck ring mold 23 of the junctions of the half sections out of which the neck ring mold is formed, the counterblow leakage seeping to the file vents 38 between the abutting surfaces of the finish ring 24 and the neck ring mold 23.

A baffle seating surface 41 is formed in the upper face of the blank mold 22 and a funnel 42, having a central axial guide passage 43, is seated therein for reception of the glass gob 37 therethrough. After the glass gob 37 has been introduced into the blank mold 22 through the funnel 42, a baffle 44 having air passages 45 therethrough is brought into sealing contact with the complementary upper seat face of the funnel 42. The baffle 44 has an end forming surface 46 in the bottom thereof. Settle blow air is then introduced (from a source not shown) through the air passages 45 to form the glass in the neck mold 23, and around the plunger tip 34. The funnel 42 is then lifted and removed from the baffle seating surface, after which the baffle 44 is positioned on the baffle seating surface 41 to seal off the end of the cavity. The plunger tip 34 is then retracted and counterblow air is admitted through conduit 29, bore 30 and ports 31 and grooves 31a to form the parison in the blank mold. The male half of the blank mold 22 is provided with a pad vent 47 having a depth of .004 inch and connected by passage 48 with the atmosphere. Additional pad vents may be used if necessary, as indicated in dotted lines at 49.

In operation, when a gob of hot molten glass 37 is introduced into the parison cavity 22a of blank mold 22 and settle blow air is introduced, air trapped around the plunger tip 34 will escape through vents 33 and exhaust ports 35 and from the exhaust ports 35, via the grooves 31a and the ports 31 to the bottom of the bore 30, so that there will be an almost total glass to metal contact in the region of the plunger tip. In this manner, the temperature of the glass will be much more uniform, and when counterblow occurs, settle wave problems are virtually eliminated. It is believed that this result is achieved by virtue of the fact that the glass, being of a uniform temperature, is more evenly distributed by the counterblow air, and is not subject to the stresses that are caused where uneven temperature is present. Further, air trapped between the gob 37 and the inner surface of neck ring mold will escape through the pad vent 23a so that the glass temperature in the neck ring area and plunger tip will be more completely uniform.

Figure 2:
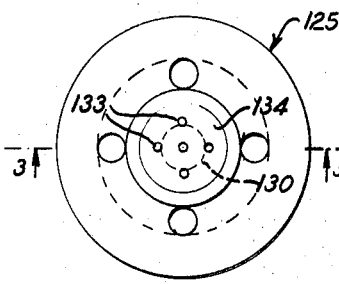
FIG. 2 is a top plan view of a modified plunger.
Figure 3:
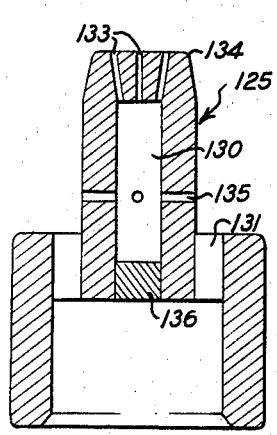
FIG. 3 is a vertical sectional view taken along the line 3—3 of FIG. 2 looking in the direction of the arrows.
Figure 4:
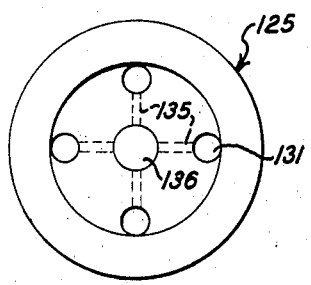
FIG. 4 is a bottom plan view of the structure illustrated in FIG. 3.

In FIGS. 2 through 4 a modified form of plunger is illustrated at 125 and has a tip 134 thorugh which extend vent ports 133 communicating with a bore 130 formed centrally of the plunger 125. Exhaust ports 135 open outwardly from the bore 130 through the side wall of the plunger 125 to permit the escape of air. A plug 136 closes the bore 130 to prevent communication directly therethrough. Ports 131 are used for the blow air and communicate the lower part of the bore 130 with the area surrounding the tip 134. The plunger 125 is used in the same manner as the plunger 25 except that it conforms to the machine with which it is used.

Figure 5:
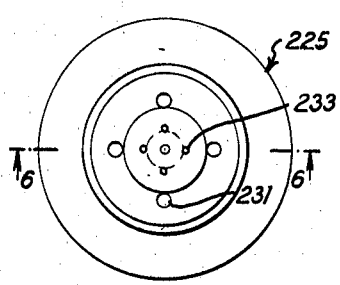
FIG. 5 is a top plan view of another modified plunger construction.
Figure 6:
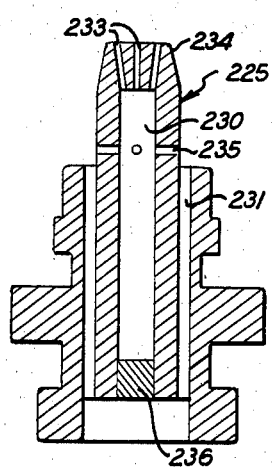
FIG. 6 is a vertical sectional view taken along the line 6—6 of FIG. 5 looking in the direction of the arrows.
Figure 7:
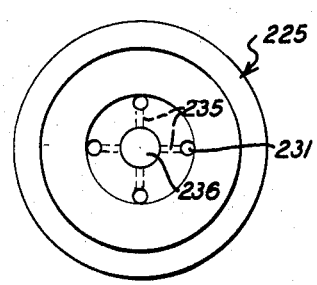
FIG. 7 is a bottom plan view of the structure illustrated in FIG. 6.

In FIGS. 5 through 7 another modified form of the invention is illustrated wherein a plunger 225 is provided having a tip 234 through which extend a plurality of ports 233 communicating with a central bore 230. A plurality of exhaust ports 235 open outwardly through the wall of the plunger 225 communicating at its inner ends with the bore 230. Ports 231 extend from the lower portion of the bore 230 upwardly through the plunger 225 terminating adjacent the tip 234. A plug 236 separates the upper and lower portions of the bore 230 to prevent direct communication therebetween.

Figure 8:
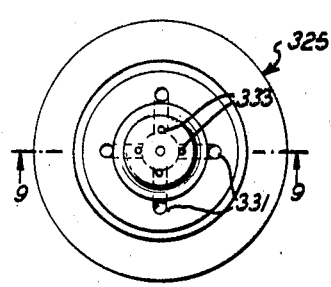
FIG. 8 is a top plan view of still another modified form of plunger.
Figure 9:
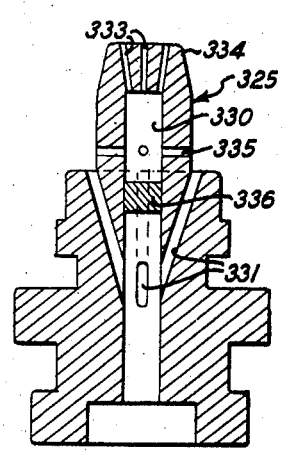
FIG. 9 is a vertical sectional view taken along the line 9—9 of FIG. 8 looking in the direction of the arrows.
Figure 10:
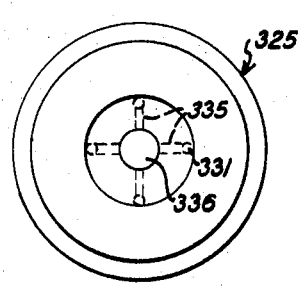
FIG. 10 is a bottom plan view of the structure illustrated in FIG. 9.
Figure 11:
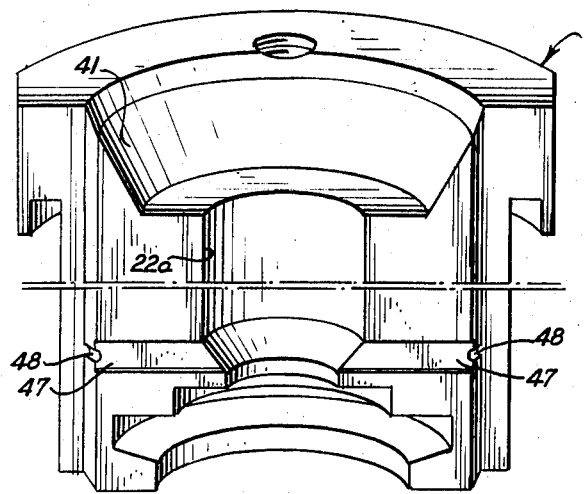
FIG. 11 is a perspective view of the male half of the blank mold, partially broken away.
Figure 12:
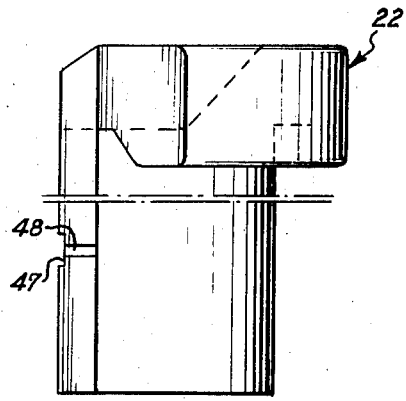
FIG. 12 is a side elevational view of the male half of the blank mold shown in FIG. 11.
Figure 13:
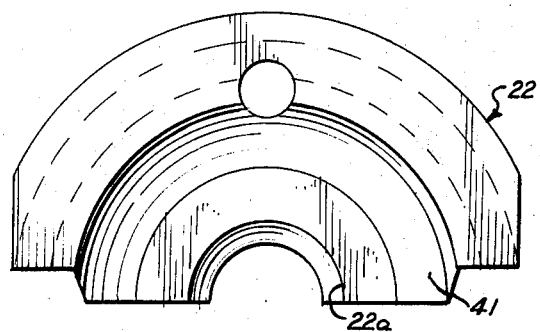
FIG. 13 is a top plan view of the male half of the blank mold shown in FIG. 11.
Figure 15:
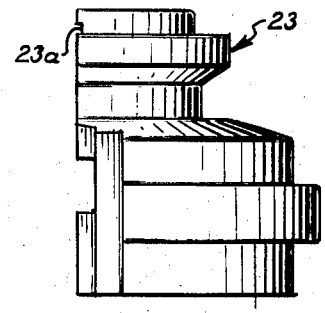
FIG. 15 is a side elevational view of the male half of the neck ring mold shown in FIG. 14.

In FIGS. 8 through 10 a further modified form of plunger is generally indicated at 325 and has a tip 334 through which extend a plurality of vent ports 333 communicating with a central bore 330 in the plunger 325. Exhaust ports 335 extend through the plunger 325 radially outwardly and have their inner ends communicating with the bore 330. A plurality of ports 331 extend upwardly and outwardly through the plunger 325 with their lower ends communicating with the lower portion of the bore 330 and their upper ends terminating adjacent the tip 334. A plug 336 separates the upper and lower portions of the bore 330 to prevent direct communication therebetween. The modified plungers 125, 225 and 325 operate in their respective machines in exactly the same manner as the plunger 25.

Having thus described the preferred embodiments of the invention, it should be understood that numerous structural modifications and adaptations may be employed without departing from the spirit of the invention.

What is claimed is:

1. A glassware forming machine comprising: a blank mold and a neck mold forming a mold cavity; a plunger located at the bottom of the mold cavity; a bore in the bottom of the plunger adapted to be connected to a source of counterblow air; counterblow passages in the plunger extending upwardly and outwardly of said bore about the periphery of the plunger and intersecting the mold cavity; an upwardly directed plunger tip at the top of the plunger located inwardly of said passages; at least one vent hole extending downwardly from the top of the plunger tip; radial exhaust ports providing communication between the bottom of said vent hole and said counterblow passages; means enabling settle blow air to be introduced into the top of the mold cavity to form glass, that is in the mold cavity, in the neck mold and around the plunger tip, the vent hole enabling air that is trapped in the mold cavity to be evacuated so that the temperature of the glass will not be affected by the presence of air adjacent the plunger tip; and means enabling counterblow air to be admitted from said bore through said passages to form a parison in the mold cavity; said radial exhaust ports inhibiting the flow of counterblow leakage from said bore into said vent hole.

2. The machine of claim 1 wherein said bore extends to the bottom of said vent hole and intersects said exhaust ports; and further comprising: a plug closing the bore between the areas of intersection of said counterblow passages and said exhaust ports with said bore.

3. The machine as defined in claim 1 further comprising: at least one vent extending through the neck mold to enable air trapped between the glass and the neck mold, pursuant to the introduction of the settle blow air, to be evacuated.

4. A device as set forth in claim 1 wherein a plurality of vent holes are provided and said holes extend inwardly at a slight angle from their upper ends to their lower ends.

5. The device of claim 3 further including vent means in said blank mold for permitting the evacuation of air trapped therein upon introduction of a glass gob.

References Cited
UNITED STATES PATENTS

| | | | |
|---|---|---|---|
| 1,259,281 | 3/1918 | Peiler | 65—229 X |
| 1,046,867 | 12/1912 | Schies | 65—234 |
| 777,261 | 12/1904 | Leistner | 65—229 |
| 3,272,612 | 9/1966 | Hamilton | 65—229 |
| 1,946,411 | 2/1934 | Roirant | 249—141 X |

ARTHUR D. KELLOGG, Primary Examiner

U.S. Cl. X.R.

65—362